Nov. 6, 1956  P. C. CAIN  2,769,651
ADJUSTABLE IDLER ARM SUPPORT
Filed Jan. 9, 1953
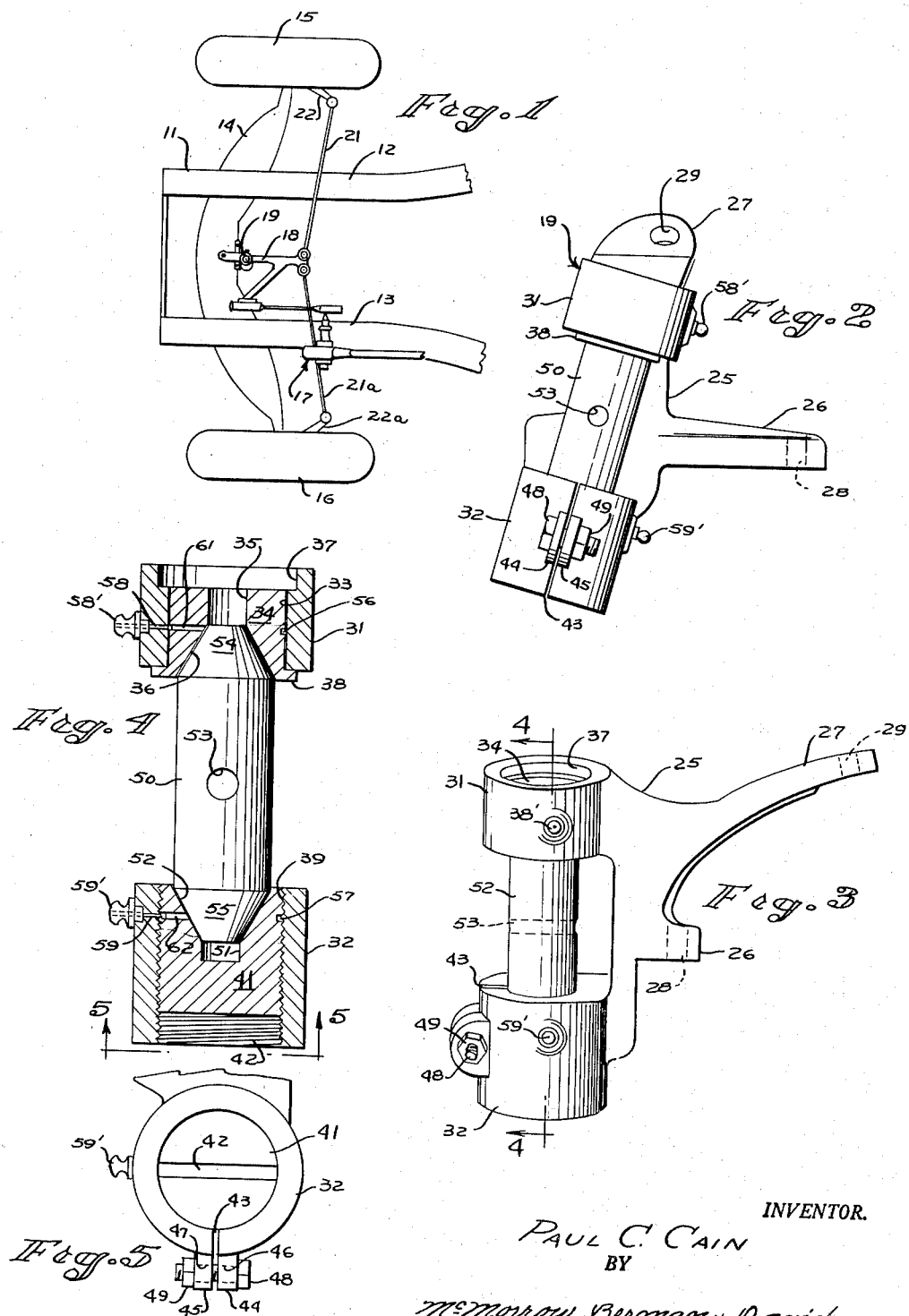
INVENTOR.
PAUL C. CAIN
BY
McMorrow, Berman & Davidson
ATTORNEYS United States Patent Office 2,769,651
Patented Nov. 6, 1956

2,769,651

ADJUSTABLE IDLER ARM SUPPORT

Paul C. Cain, Kosciusko, Miss.

Application January 9, 1953, Serial No. 330,527

2 Claims. (Cl. 287—100)

This invention relates to an adjustable idler arm support and more particularly to an adjustable bearing for supporting the pin on which the idler arm of an automobile steering linkage is supported.

It is an object of this invention to provide an idler arm support which is adjustable to compensate for wear.

It is a further object of this invention to provide an adjustable idler arm support which is simple to manufacture, and which may be readily substituted for idler arm supports of conventional construction.

It is an additional object of this invention to provide an adjustable idler arm support which is inexpensive and which may be easily adjusted and positively retained in adjusted position.

Further objects and advantages of the invention will become apparent from the following description and claims, and from the accompanying drawings, wherein:

Figure 1 is a plan view of a portion of a vehicle frame showing the front wheels of the vehicle and the manner of applying my invention.

Figure 2 is a rear elevation of a bracket embodying the present invention.

Figure 3 is a side elevation of the bracket of Figure 2.

Figure 4 is a cross sectional view taken on the line 4—4 of Figure 3.

Figure 5 is a bottom view projected on the plane 5—5 of Figure 4.

Referring now to Figure 1 of the drawings, 11 designates generally the front end of a conventional vehicle chassis having the longitudinal frame members 12, 13 which support the transverse frame member 14 having the front wheels 15, 16 supported thereon for rotation about the axles of the wheels, the axles being movably supported for steering movement, as is well understood in the art. The steering gear, designated generally at 17, is connected to idler arm 18, pivotally supported in the bracket 19. Idler arm 18 is in turn pivotally connected with the steering linkages 21, 22 and 21a, 22a. As is well known in the art, rotation of steering gear 17 oscillates the idler arm 18 about its support 19, which oscillation is in turn transmitted to the steering linkages 21, 22 and 21a, 22a, and thus to the wheels 15, 16 whereby to steer the vehicle.

Referring now to Figures 2 to 5, there is shown the improved idler arm support, designated generally at 19, according to the present invention. Support 19 comprises the bracket 25 having a horizontal arm 26 and the forwardly and upwardly extending arm 27. Arms 26 and 27 are provided with bolt holes 28 and 29, respectively, whereby the brackets may be secured to the transverse frame member 14. Integral with the brackets 25 are the spaced axially aligned bosses 31 and 32, having a common axis disposed at an angle to the vertical, as is well understood in the art. Upper boss 31 is bored, as at 33, to receive a bushing 34 having an axial bore 35 and a tapered bore 36 coaxial therewith. Boss 31 is counterbored, as at 37, and the bushing 34 has a flange 38 engaging the under surface of the boss to prevent displacement of bushing 34 upwardly through the boss 33.

Boss 32 is provided with a threaded bore 39 coaxial with the bore 33, a threaded bushing 41 being threadedly engaged in the bore 39. A slot 42, diametrically disposed relative to the bushing 41 is provided for a purpose later to be described. Boss 32 is radially slotted, as at 43, and is provided with facing flanges 44, 45 having the aligned bolt holes 46, 47, respectively. A bolt 48, having a nut 49 thereon, is adapted to clampingly engage flanges 44, 45, thereby holding the bushing 41 against rotation in the boss 32.

Bushing 41 is further provided with a bore 51 and has a coaxial tapered bore 52 complementary to the bore 36. A pin 50, having a hole 53 diametrically extending therethrough, is adapted to support the idler arm 18, the tapered ends 54 and 55 being received in the bores 36 and 52 respectively and being supported therein for pivotal movement, thereby to permit oscillation of the idler arm 18. Bushings 34 and 41 are provided with peripheral grooves 56 and 57 aligned with the lubricant passages 58 and 59, terminating in fittings 58' and 59' in the bosses 31 and 32 respectively. Lubricant passages 61 and 62 communicate with the grooves 56 and 57 at one of the ends thereof and with the conical bearing surfaces 36 and 52 at the other ends thereof.

From the foregoing it will be seen that the idler arm is pivotally supported on pin 50. Should the mating conical bearing surfaces become worn through use, the bolt 48 may be loosened, thus freeing the bushing 41 for rotation. A screw driver or the like may then be inserted in the slot 42 and the bushing rotated by that amount necessary to advance the bushing to take up the wear, whereupon the bolt 48 may again be tightened to clamp the boss 32 and retain the bushing 41 against further rotation. It will be thus seen that I have provided a novel idler arm support having means for adjusting for wear on the bearing surfaces. Though the device has been described in terms of an idler arm support bearing, it will be realized that my device is useful wherever a combined radial and thrust bearing having means for adjusting for wear is desired.

While a specific embodiment of an improved idler arm support has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. For use with a vehicle chassis having a transverse frame member supported by a pair of front wheels, an idler arm positioned adjacent said frame member, a steering gear connected to said idler arm, and steering linkages operatively connected to said wheels and each pivotally connected to said idler arm; a device for connecting said idler arm to said cross member for oscillatory movement, said device comprising an upstanding bracket, a pair of bosses arranged in superimposed spaced axially aligned relation carried by said bracket, the upper one of said bosses being provided with a smooth bore, a bushing in the smooth bore of the upper one of said bosses, said bushing having a bore tapering inwardly from the face adjacent the lower one of said bosses and terminating at a point spaced from the other face remote from the lower one of said bosses, a flange on said bushing and bearing against the face adjacent the lower one of said bosses, the lower one of said bosses being provided with a threaded bore extending from the face adjacent the upper one of said bosses to the other face remote from the upper one of said bosses, an externally threaded bushing in threaded engagement with the threaded bore of said lower one of said bosses, said threaded bushing having a bore extending inwardly from the face adjacent the upper one of said bosses and terminating at a point spaced from the other face remote from the upper one of said bosses, a pin having tapered end portions positioned between said bosses and having each of the tapered end portions engaging the tapering bore of the adjacent bushings, means on the intermediate portion of said pin for attachment of said idler arm thereto, there being a slot in said lower one of said bosses extending from said face to the other said face thereof, cooperating fastening means on said lower one of said bosses for releasably clamping the latter to said threaded bushing to prevent rotation of the threaded bushing in said lower one of said bosses, each of said bushings having a peripheral annular groove and a transversely extending passage in communication with said groove and the tapering bore of the adjacent bushing and also in communication with a lubricant passage formed in the adjacent boss, and means on said bracket for attaching the latter to said frame member.

2. For use with a vehicle chassis having a transverse frame member supported by a pair of front wheels, an idler arm positioned adjacent said frame member, a steering gear connected to said idler arm, and steering linkages operatively connected to said wheels and each pivotally connected to said idler arm; a device for connecting said idler arm to said cross member for oscillatory movement, said device comprising an upstanding bracket, a pair of bosses arranged in superimposed spaced axially aligned relation carried by said bracket, the upper one of said bosses being provided with a smooth bore, a bushing in the smooth bore of the upper one of said bosses, said bushing having a bore tapering inwardly from the face adjacent the lower one of said bosses and terminating at a point spaced from the other face remote from the lower one of said bosses, a flange on said bushing and bearing against the face adjacent the lower one of said bosses, the lower one of said bosses being provided with a threaded bore extending from the face adjacent the upper one of said bosses to the other face remote from the upper one of said bosses, an externally threaded bushing in threaded engagement with the threaded bore of said lower one of said bosses, said threaded bushing having a bore extending inwardly from the face adjacent the upper one of said bosses and terminating at a point spaced from the other face remote from the upper one of said bosses, a pin having tapered end portions positioned between said bosses and having each of the tapered end portions engaging the tapering bore of the adjacent bushings, means on the intermediate portion of said pin for attachment of said idler arm thereto, there being a slot in said lower one of said bosses extending from said face to the other said face thereof, a pair of flanges arranged on opposite sides of said slot and projecting exteriorly of said lower one of said bosses, fastening elements extending through said flanges for releasably clamping the lower one of said bosses to said threaded bushing to prevent rotation of the threaded bushing in said lower one of said bosses, each of said bushings having a peripheral annular groove and a transversely extending passage in communication with said groove and the tapering bore of the adjacent bushing and also in communication with a lubricant passage formed in the adjacent boss, and means on said bracket for attaching the latter to said frame member.

References Cited in the file of this patent
UNITED STATES PATENTS

| | | |
|---|---|---|
| 945,712 | Fletcher | Jan. 4, 1910 |
| 1,303,213 | Lea | May 6, 1919 |
| 2,557,331 | Wintercorn | June 19, 1951 |
| 2,632,656 | Balcom | Mar. 24, 1953 |